(12) United States Patent
Liu et al.

(10) Patent No.: US 12,034,375 B2
(45) Date of Patent: Jul. 9, 2024

(54) VEHICLE DC VOLTAGE CONVERSION CIRCUIT

(71) Applicants: Ningbo Geely Royal Engine Components Co., Ltd., Ningbo (CN); Aurobay Technology Co., Ltd., Ningbo (CN); Zhejiang Geely Holding Group Co., Ltd., Hangzhou (CN)

(72) Inventors: Junqi Liu, Ningbo (CN); Chen Yang, Ningbo (CN); Shubo Li, Ningbo (CN); Lijun Wang, Ningbo (CN); Xiaochun Zhu, Ningbo (CN); Fangke Li, Ningbo (CN); Ruiping Wang, Ningbo (CN); Yige Xiao, Ningbo (CN)

(73) Assignees: Ningbo Geely Royal Engine Components Co., Ltd., Ningbo (CN); Aurobay Technology Co., Ltd., Ningbo (CN); Zhejiang Geely Holding Group Co., Ltd., Hangzhou (CN)

( * ) Notice: Subject to any disclaimer, the term of this patent is extended or adjusted under 35 U.S.C. 154(b) by 0 days.

(21) Appl. No.: 18/041,803

(22) PCT Filed: Jun. 13, 2022

(86) PCT No.: PCT/CN2022/098491
§ 371 (c)(1),
(2) Date: Feb. 16, 2023

(87) PCT Pub. No.: WO2023/005466
PCT Pub. Date: Feb. 2, 2023

(65) Prior Publication Data
US 2023/0299684 A1    Sep. 21, 2023

(30) Foreign Application Priority Data

Jul. 30, 2021 (CN) .......................... 202110875619.7

(51) Int. Cl.
*H02M 3/335* (2006.01)
*B60L 53/22* (2019.01)
*B60L 1/02* (2006.01)
*F01N 3/20* (2006.01)

(52) U.S. Cl.
CPC ........... *H02M 3/3353* (2013.01); *B60L 53/22* (2019.02); *H02M 3/33561* (2013.01); *B60L 1/02* (2013.01);
(Continued)

(58) Field of Classification Search
None
See application file for complete search history.

(56) References Cited

U.S. PATENT DOCUMENTS

2016/0280081 A1* 9/2016 Lasagni ................. B60L 50/51

FOREIGN PATENT DOCUMENTS

| CN | 207053401 U | 2/2018 |
| CN | 109167518 A | 1/2019 |

(Continued)

OTHER PUBLICATIONS

Search report of CN application No. 202110875619.7 issued on Jun. 24, 2022.
(Continued)

*Primary Examiner* — Jared Fureman
*Assistant Examiner* — Aqeel H Bukhari
(74) *Attorney, Agent, or Firm* — Andrew C. Cheng

(57) ABSTRACT

This application provides a vehicle DC voltage conversion circuit, including a high voltage battery connected in sequence, a primary-side-bridge module, a resonant module, a transformer module and a secondary-side-output module, wherein the secondary-side-output module includes a first voltage unit outputting a first voltage and a second voltage unit outputting a second voltage. The secondary side winding of the transformer is connected with the first voltage unit (Continued)

and the second voltage unit; The circuit also includes a driver module connected with the original side bridge module. The vehicle DC voltage conversion circuit provided in this application can not only output the first voltage, but also output the second voltage at the same time. It has the advantages of small size, high efficiency, low cost and industrialization, and can be widely used in the vehicle 48V electrical load, such as 48V vehicle electric heating system, 48V vehicle cooling fan, and so on.

9 Claims, 6 Drawing Sheets

(52) U.S. Cl.
CPC ......... *B60L 2210/10* (2013.01); *F01N 3/2013* (2013.01)

(56) References Cited

FOREIGN PATENT DOCUMENTS

| | | | | |
|---|---|---|---|---|
| CN | 110040028 | A | 7/2019 | |
| CN | 110138239 | A | 8/2019 | |
| CN | 111463878 | A | 7/2020 | |
| CN | 111614267 | A | 9/2020 | |
| CN | 112572189 | A | 3/2021 | |
| CN | 113147447 | A | 7/2021 | |
| CN | 113472214 | A | 10/2021 | |
| KR | 2022029301 | A * | 3/2022 | ............. B60L 53/22 |
| WO | 2018077230 | A1 | 5/2018 | |
| WO | 2019199964 | A1 | 10/2019 | |

OTHER PUBLICATIONS

Search report of CN application No. 202110875619.7 issued on Oct. 28, 2022.
The first OA of CN application No. 202110875619.7 issued on Jun. 24, 2022.
The second OA of CN application No. 202110875619.7 issued on Oct. 28, 2022.
International Search Report of PCT Patent Application No. PCT/CN2022/098491 issued on Aug. 23, 2022.

* cited by examiner

VEHICLE DC VOLTAGE CONVERSION CIRCUIT

CROSS REFERENCE TO RELATED APPLICATION

The present disclosure is the national phase entry of International Patent Application No. PCT/CN2022/098491, filed on Jun. 13, 2022, which claims priority to Chinese Patent Application No. 202110875619.7, filed on Jun. 30, 2021. All of the aforementioned patent applications are hereby incorporated by reference in their entireties.

TECHNICAL FIELD

This application relates to the technical field of vehicle power supplies, and in particular to a vehicle DC voltage conversion circuit.

BACKGROUND

The 12V direct current conversion circuit (DC-DC) in a hybrid vehicle is equivalent to the generator of a traditional car. Its main purpose is to convert the high voltage of the 200-400V lithium battery of the vehicle into a 12V low voltage, which is used to provide low voltage to the vehicle. It supplies power to the load and also charges the 12V low-voltage battery. At present, a 12V DC conversion circuit for a hybrid electric vehicle generally outputs a 12V DC power supply, and the power is generally between 1 to 3 kW. With the continuous improvement of people requirements for automobiles in the future, low-voltage power facilities on vehicles are constantly increasing. In some cases, 48V power supply is required. For example, in order to improve the emission reduction efficiency in the future exhaust emission reduction technology, it will be applied to 48V catalyst electric heating technology; in order to reduce line losses and improve thermal management efficiency, some high-power low-voltage electrical components in the future may also use 48V power supplies, such as 48V cooling fans, 48V electric heaters, blowers, etc.

Technical Problem

There are some flaws in the prior art solution:
for current hybrid vehicles, the 12V DC conversion circuit can only provide one 12V power supply, which cannot meet this technical requirement. Therefore, in order to meet future technical requirements, the research on a 12V DC conversion circuit integrated with a 48V power supply is A very necessary task. In addition, in order to improve competitiveness in the future market, taking into account the requirements of the DC conversion circuit in terms of vehicle layout, voltage platform, and low cost, the 12V DC converter circuit of hybrid electric vehicle integrated with 48V power supply not only requires small volume, wide applicable voltage range, but also low cost, easy to industrialization.

Technology Solution

This application provides a vehicle DC voltage conversion circuit, which is used to solve the problem that the 12V DC conversion circuit can only provide one 12V power supply, which cannot meet the need to apply a 48V power supply.

In one aspect, the present application provides a vehicle DC voltage conversion circuit. Specifically, the DC voltage conversion circuit includes a high-voltage battery, a primary-side-bridge module, a resonance module, a transformer module, and a secondary-side-output module connected in sequence, wherein the secondary-side-output module includes a first voltage unit configured to output a first voltage output module and a second voltage unit configured to output a second voltage, secondary windings of the transformer module is connected to the first voltage unit and the second voltage unit respectively;

the circuit further including a drive module connected with the primary-side-bridge module; the primary-side-bridge module including a plurality of primary side half bridges connected to each other, each primary side half bridge including two switch elements connected in series; the drive module is respectively connected to the control end of each switch element of the primary-side-bridge module, to control the on-off of the switch element of the primary-side-bridge module.

Optionally, the primary-side-bridge module in the circuit includes a first half bridge and a second half bridge connected in series, and the first half bridge includes a first switch element and a second switch element connected in series, the second half-bridge includes a third switch element and a fourth switch element connected in series, a common end of the first switch element and the second switch element is connected to the resonance module, and the common end of the fourth switch element and the third switch element is connected to the resonance module.

Optionally, the resonance module in the circuit includes a first resonance unit and a second resonance unit, the first resonance unit includes a first inductor, a first capacitor, and a second capacitor, and the second resonance unit includes a second inductor, a third capacitor, and a fourth capacitor, the transformer module includes a first transformer and a second transformer;

the first switch element, the second switch element, and the third switch element and the fourth switch element are connected in series between a positive bus bar and a negative bus bar of the high-voltage battery in sequence, and the common end of the first switch element and the second switch element is connected to a first end of the first inductor, the common end of the third switch element and the fourth switch element is connected to a first end of the second inductors;

a second end of the first inductor is connected to a primary non-inverting end of the first transformer, a second end of the second inductor is connected to a primary non-inverting end of the second transformer;

the first capacitor, the second capacitor, the third capacitor, and the fourth capacitor are connected in series between the positive bus bar and the negative bus bar in sequence, a common end of the second capacitor and the third capacitor is connected to the common end of the second switch element and the third switch element, the common end of the first capacitor and the second capacitor is connected to a primary inverting end of the first transformer, and a common end of the third capacitor and the fourth capacitor is connected to a primary inverting end of the second transformer.

Optionally, the first switch element, the second switch element, the third switch element, and the fourth switch element in the circuit are selected from at least one of MOS field effect transistors, junction field effect transistors, transistors and relays.

Optionally, the transformer module in the circuit includes a secondary winding with a center tap, the center tap and the secondary non-inverting end and/or the secondary inverting end of the secondary winding are connected to a first voltage circuit of the first voltage unit; the secondary non-inverting end and the secondary inverting end of the secondary winding are connected to a second voltage circuit of the second voltage unit.

The first voltage circuit in the circuit includes a fifth switch element and a fifth capacitor, and an output end of the fifth switch element is connected to the secondary non-inverting end or the secondary inverting end, and the fifth capacitor is connected between an input end of the fifth switch element and the center tap.

Optionally, the first voltage circuit in the circuit further includes a sixth switch element, an input end of the sixth switch element is connected to the input end of the fifth switch element, and the secondary non-inverting end and the secondary inverting end are respectively connected to one output end of the sixth switch element and the fifth switch element.

Optionally, the fifth switch element and the sixth switch element in the circuit are selected from at least one of diodes, MOS field effect transistors, junction field effect transistors, transistors, and relays.

Optionally, the second voltage circuit in the circuit includes a seventh switch element, an eighth switch element, a seventh capacitor, and an eighth capacitor; the output end of the seventh switch element is connected to the positive pole of the second voltage, the input end of the eighth switch element is connected to the negative pole of the second voltage, and an input end of the seventh switch element and an output end of the eighth switch element are connected to the secondary non-inverting end; the seventh capacitor and the eighth capacitor are connected in series between the positive and negative pole of the second voltage, and a common end of the seventh capacitor and the eighth capacitor is connected to the secondary inverting end.

Optionally, the transformer module in the circuit includes the transformer module includes a first transformer and a second transformer, a first secondary winding of the first transformer is provided with a first center tap, and a second secondary winding of a second transformer is provided with a second center tap:

the first voltage unit includes a first-first voltage circuit and a first-second voltage circuit outputting in parallel, the first center tap and the secondary non-inverting end and/or the secondary inverting end of the first secondary winding are connected to the first-first voltage circuit, and the second center tap and the secondary non-inverting end and/or the secondary inverting end of the second secondary winding are connected to the first-second voltage circuit;

and/or, the second voltage unit includes a second-first voltage circuit and a second-second voltage circuit outputting in parallel, and the secondary non-inverting end and the secondary inverting end of the first secondary winding are connected to the second-first voltage circuit, and the secondary non-inverting end and the secondary inverting end of the second secondary winding are connected to the second-second voltage circuit.

Beneficial Effect

As mentioned above, the vehicle DC voltage conversion circuit provided by the present application can not only simultaneously provide two kinds of DC voltage power supply also has the advantages of low cost, small size, high efficiency, and easy industrialization and mass production.

BRIEF DESCRIPTION OF THE DRAWINGS

The drawings here are incorporated into the specification and constitute a part of the specification, show embodiments that conform to the application, and are used together with the specification to explain the principle of the application. In order to more clearly illustrate the technical solutions of the embodiments of the present application, the following will briefly introduce the accompanying drawings used in the description of the embodiments. Obviously, for those of ordinary skill in the art, they will not pay any creative labor. Under the premise, other drawings can be obtained based on these drawings.

The realization, functional characteristics, and advantages of the purpose of this application will be further described in conjunction with the embodiments and with reference to the accompanying drawings. Through the above drawings, the specific embodiments of the present application have been shown, which will be described in more detail later. These drawings and text descriptions are not intended to limit the scope of the concept of the present application in any way, but to explain the concept of the present application for those skilled in the art by referring to specific embodiments.

DETAILED DESCRIPTION OF PREFERRED EMBODIMENTS

Here, exemplary embodiments will be described in detail, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present application. On the contrary, they are merely examples of devices and methods consistent with some aspects of the application as detailed in the appended Claims.

It should be noted that, in this article, the terms "comprise", "include" or any other variants thereof are intended to cover non-exclusive inclusion, so that a process, method, article or device including a series of elements not only includes Those elements also include other elements that are not explicitly listed, or elements inherent to the process, method, article, or device. Without more restrictions, the element defined by the sentence "including a . . . " does not exclude the existence of other same elements in the process, method, article or device that includes the element. In addition, the application is implemented differently. Components, features, and elements with the same name in the examples may have the same meaning or different meanings, and their specific meanings need to be determined by their explanation in the specific embodiment or further combined with the context in the specific embodiment.

It should be understood that the specific embodiments described herein are only used to explain the application, and are not used to limit the application.

Figure 1:
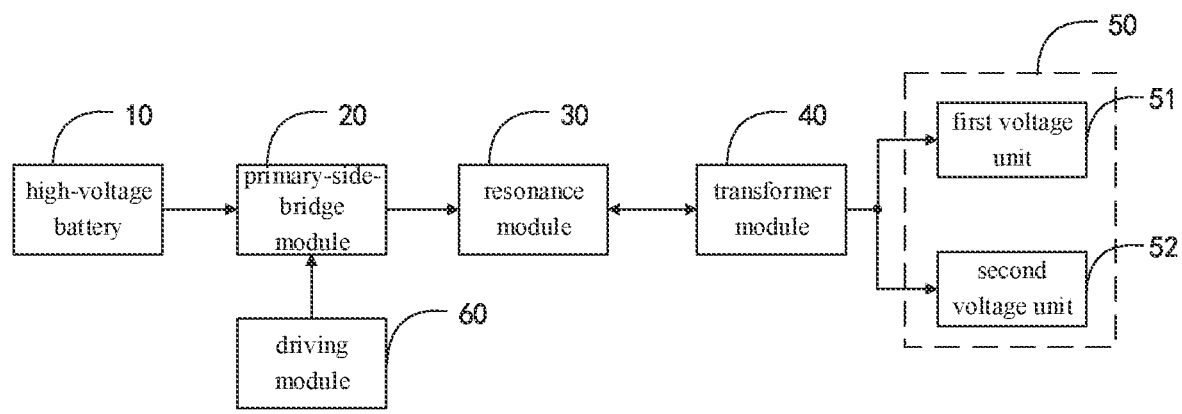
FIG. 1 is a block diagram of the vehicle DC voltage conversion circuit of this application embodiment.

In one aspect, the present application provides a vehicle DC voltage conversion circuit. FIG. 1 is a block diagram of a vehicle DC voltage conversion circuit according to an embodiment of the application.

Please refer to FIG. 1, in an embodiment, the vehicle DC voltage conversion circuit includes a high-voltage battery 10, a primary-side-bridge module 20, a resonance module 30, a transformer module 40, and a secondary-side-output module 50.

wherein, the secondary-side-output module 50 includes a first voltage unit 51 that outputs a first voltage and a second voltage unit 52 that outputs a second voltage, and the secondary winding of the transformer module 40 is connected to the first voltage unit 51 and the second voltage unit, respectively 52.

In this embodiment, the vehicle DC voltage conversion circuit can not only output 12V DC power, but also 48V DC power, and has the advantages of small size, high efficiency, low cost, and industrialization.

Please continue to refer to FIG. 1, in an embodiment, the vehicle DC voltage conversion circuit further includes a driving module 60 connected to the primary-side-bridge module 20; the primary-side-bridge module 20 includes a plurality of primary side half bridges or primary-side-full-bridges connected to each other. Each primary side half bridge includes two switch elements connected in series, each primary-side-full-bridge may include two primary side half bridges connected in parallel, and the primary-side-full-bridge may be composed of four switch elements.

The driving module 60 is respectively connected to the control end of each switch element in the primary-side-bridge module 20 to control the two switch elements in each primary side half bridge to alternately turn on and off.

The driving module 60 controls the switch elements in the primary half bridge to alternately turn on and off so that the current in the high-voltage battery 10 periodically passes through the primary-side-bridge module 20.

Figure 2:
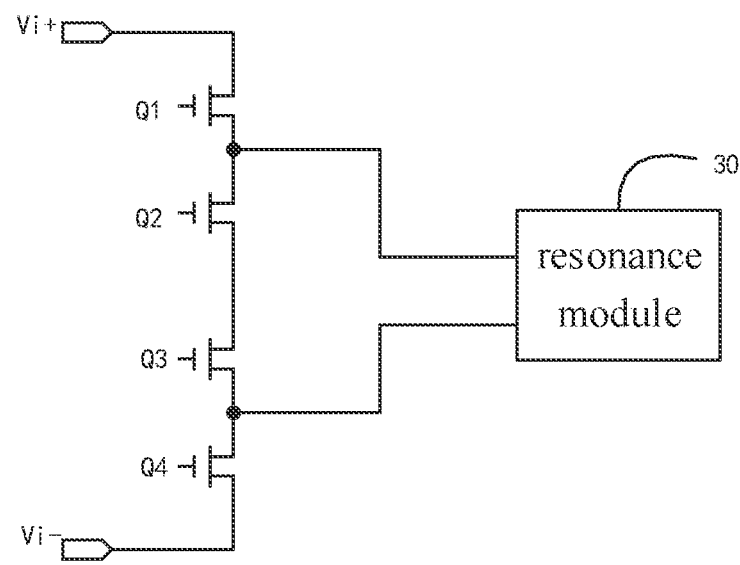
FIG. 2 is the connection diagram of the primary-side-full-bridge circuit according to an embodiment of the application.

FIG. 2 is the connection diagram of the primary-side-full-bridge circuit according to an embodiment of the application.

Please refer to FIG. 2. In an embodiment, the primary-side-bridge module 20 in the vehicle DC voltage conversion circuit is a primary-side-full-bridge. The primary-side-bridge module 20 includes a first half bridge and a second half bridge. The first half bridge and the second half bridge are connected in parallel at the high voltage DC input end to form a full bridge circuit.

The first half bridge includes a first switch element Q1 and a second switch element Q2 connected in series, and the second half bridge includes a third switch element Q3 and a fourth switch element Q4 connected in series. The common end of the first switch element Q1 and the second switch element Q2 is connected to the resonance module 30, and the common end of the third switch element Q3 and the fourth switch element Q4 is connected to the resonance module 30.

Figure 3:
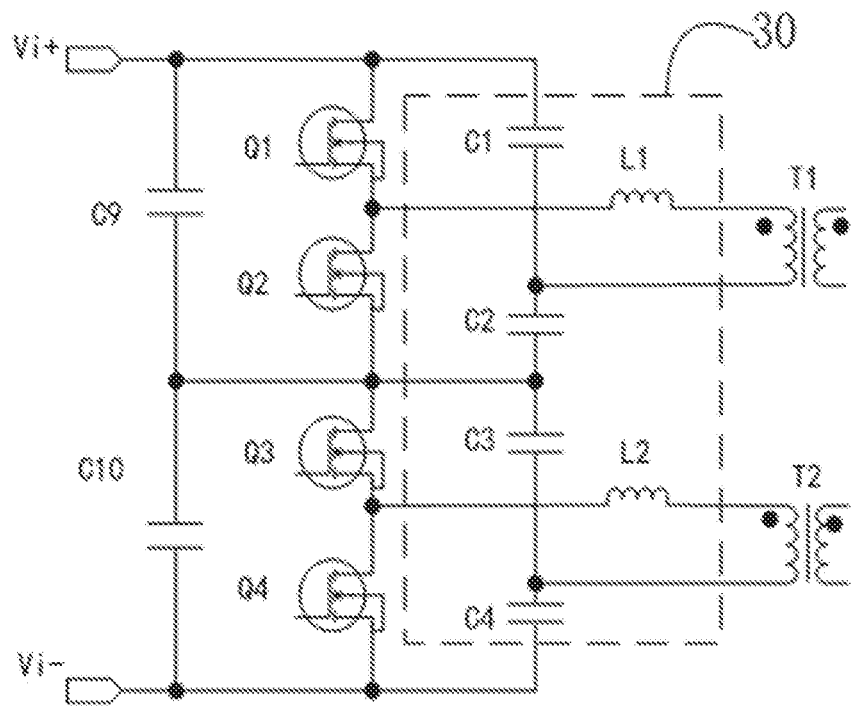
FIG. 3 shows the connection diagram of the primary side of the vehicle DC voltage conversion circuit in an embodiment of this application.

FIG. 3 shows the connection diagram of the primary side of the vehicle DC voltage conversion circuit in an embodiment of this application.

As shown in FIG. 3, in an embodiment, the primary-side-bridge module 20 in the vehicle DC voltage conversion circuit includes a first half bridge and a second half bridge. The first half bridge and the second half bridge are connected in series between the positive bus Vi+ and the negative bus Vi of the high-voltage battery 10.

The first half bridge includes a first switch element Q1 and a second switch element Q2 connected in series, and the second half bridge includes a third switch element Q3 and a fourth switch element Q4 connected in series. The common end of the first switch element Q1 and the second switch element Q2 is connected to the resonance module 30, and the common end of the third switch element Q3 and the fourth switch element Q4 is connected to the resonance module 30.

The primary half bridge connected in series can greatly reduce the input voltage drop of the resonant circuit, so that more low-voltage components can be used. In the selection of components in circuit applications, the range of options is increased, which can effectively reduce production costs and facilitate modular design.

In an embodiment, the driving module 60 controls the first switch element Q1 and the third switch element Q3 to switch synchronously, and the second switch element Q2 and the fourth switch element Q4 synchronously switch. In other embodiments, the switching timing of the first switch element Q1, the third switch element Q3, the second switch element Q2, and the fourth switch element Q4 can also be controlled with specific phases and duty cycles according to specific load requirements.

Please continue to refer to FIG. 3, in one embodiment, the vehicle DC voltage conversion circuit further includes a ninth capacitor C9 and a tenth capacitor C10, and the ninth capacitor C9 and the tenth capacitor C10 are connected in series between the positive bus Vi+ and the negative bus Vi− of the high-voltage battery 10. The common end of the ninth capacitor C9 and the tenth capacitor C10 is connected to the common end of the second switch element Q2 and the third switch element Q3. The ninth capacitor C9 and the tenth capacitor C10 are input-stage capacitors, which can filter and balance the input voltage of the rear two-way half-bridge LLC resonant converter.

Please continue to refer to FIG. 3, in an embodiment, the resonance module 30 in the vehicle DC voltage conversion circuit includes a first resonance unit and a second resonance unit, and the first resonance unit includes a first inductor L1 and a first capacitor C1, and a second capacitor C2, the second resonance unit includes a second inductor L2, a third capacitor C3, and a fourth capacitor C4, and the transformer module 40 includes a first transformer T1 and a second transformer T2;

The resonance module 30 and the primary-side-bridge module 20 form a half-bridge LLC resonant converter, so that the operating frequency of the entire system is 100-300 KHZ, and it has the advantages of high output power, low loss, and small size.

Please continue to refer to FIG. 3, the first switch element Q1, the second switch element Q2, the third switch element Q3, and the fourth switch element Q4 are sequentially connected in series between the positive bus Vi+ and the negative bus Vi− of the high-voltage battery 10. The common end of the first switch element Q1 and the second switch element Q2 is connected to the first end of the first inductor L1, and the common end of the third switch element Q3 and the fourth switch element Q4 is connected to the first end of the second inductor L2.

Please continue to refer to FIG. 3, the second end of the first inductor L1 is connected to the primary non-inverting end of the first transformer T1, and the second end of the second inductor L2 is connected to the primary non-inverting end of the second transformer T2.

Please continue to refer to FIG. 3, the first capacitor C1, the second capacitor C2, the third capacitor C3, and the fourth capacitor C4 are sequentially connected in series between the positive bus Vi+ and the negative bus Vi−, and the common end of the second capacitor C2 and the third capacitor C3 is connected to the common end of the second switch element Q1 and the third switch element Q3, the common end of the first capacitor C1 and the second capacitor C2 is connected to the primary inverting end of the first transformer T1, the common end of the third capacitor C3 and the fourth of the capacitor C4 is connected to the primary inverting end of the second transformer T2.

In this embodiment, when the current is in the positive half cycle, the first switch element Q1 and the third switch element Q3 are turned on, the second switch element Q2 and the fourth switch element Q4 are turned off, and the current passes the positive bus Vi+ through the first switching component Q1, the first inductor L1, the primary non-inverting end of the first transformer T1, the primary inverting end of the first transformer T1, the second capacitor C2, the third switching component Q3, the second inductor L3, and the primary non-inverting end of the second transformer T2, the primary inverting end of the second transformer T2, the fourth capacitor C4, and finally return to the negative bus Vi−, realizing a complete positive half-cycle loop; when the current is in the negative half-cycle, the first switch element Q1 and the third switch element Q3 are turn off, and the second switch element Q2 and the fourth switch element Q4 are turned on, the current flows from the positive bus Vi+ through the first capacitor C1, the primary inverting end of the first transformer T1, the primary non-inverting end of the first transformer T1, and the first inductor L1, the second switching component Q2, the third capacitor C3, the primary inverting end of the second transformer T2, the primary non-inverting end of the second transformer T2, the fourth switching component Q4, and finally return to the negative bus Vi− to realize a complete negative half-cycle loop.

The vehicle DC voltage conversion circuit adopts a series LLC resonant circuit in the transformer input stage, which can realize the full coverage of the input voltage from 200 to 700V, which can not only adapt to a wide voltage range input, but also facilitate the selection of power devices such as MOSFETs. Can choose to use conventional 300/600V MOSFET series products, which is conducive to system cost optimization and circuit reliability improvement.

It should be noted that, in the above embodiments, the application does not limit the type of the switch element. The first switch element Q1, the second switch element Q2, the third switch element Q3, and the fourth switch element Q4 in the vehicle DC voltage conversion circuit can be selected from at least one of MOS field effect transistors, junction field effect transistors, transistors, and relays.

In an embodiment, the transformer module 40 in the vehicle DC voltage conversion circuit includes a secondary winding with a center tap.

The center tap, the secondary non-inverting end and the secondary inverting end of the secondary winding may be connected to the first voltage circuit in the first voltage unit 51 (please refer to FIG. 1). The secondary non-inverting end and the secondary inverting end of the secondary winding can be connected to the second voltage circuit in the second voltage unit 52 (please refer to FIG. 1) to boost the output of the induced voltage of the secondary winding.

Figure 4:
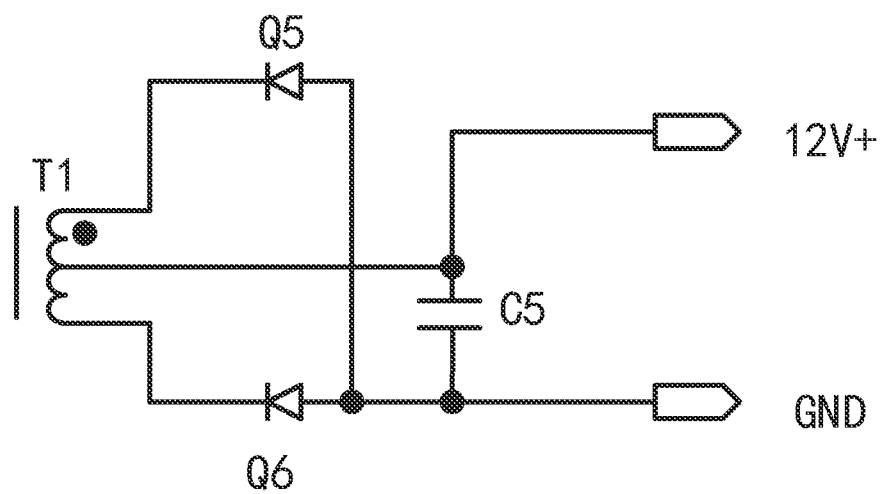
FIG. 4 is a circuit connection diagram of the first voltage unit according to an embodiment of the application.

FIG. 4 is a circuit connection diagram of the first voltage unit according to an embodiment of the application.

Please refer to FIG. 4, in an embodiment, the first voltage circuit in the vehicle DC voltage conversion circuit includes a fifth switch element Q5 and a fifth capacitor C5.

The output end of the fifth switch element Q5 is connected to the secondary non-inverting end, and the fifth capacitor C5 is connected between the input end of the fifth switch element Q5 and the center tap. In another embodiment, the output end of the fifth switch element Q5 may also be connected to the secondary inverting end.

By rectifying and filtering the secondary winding, a specific voltage output can be obtained.

Please continue to refer to FIG. 4, in an embodiment, the first voltage circuit in the vehicle DC voltage conversion circuit further includes a sixth switch element Q6. The input end of the sixth switch element Q6 is connected to the input end of the fifth switch element Q5, and the output end of the sixth switch element Q6 is connected to the secondary inverting end.

Please continue to refer to FIG. 4, in an embodiment, the input end of the fifth switch element Q5 is connected to the negative pole Vo1− of the first voltage, and the common end of the fifth capacitor C5 and the center tap is connected to the positive pole Vo1+ of the first voltage.

In this embodiment, during the positive half cycle of the current, the fifth switch element Q5 is turned off, and the sixth switch element Q6 is turned on. Through the filtering of the fifth capacitor C5, the first voltage unit outputs the first voltage. In the negative half cycle of the current, the fifth switch element Q5 is turned on and the sixth switch element Q6 is turned off. Through the filtering of the fifth capacitor C5, the first voltage circuit outputs the first voltage. Through the full-wave rectification and filtering of the secondary winding, relatively high-quality and stable specific voltage output can be obtained.

It should be noted that in the above embodiments, the present application does not limit the type of the switch element. The fifth switch element Q5 and the sixth switch element Q6 in the vehicle DC voltage conversion circuit are selected from at least one of diodes, MOS field effect transistors, junction field effect transistors, transistors and relays. Considering cost and power comprehensively, select the appropriate type of switch.

Figure 5:
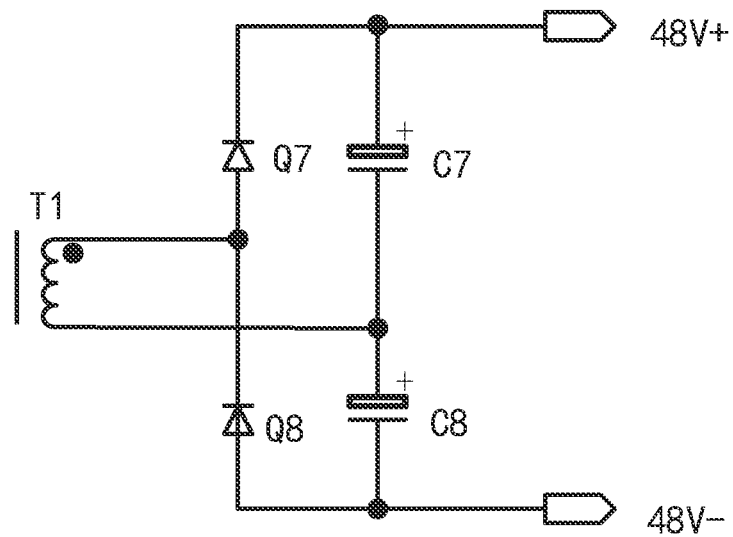
FIG. 5 is a circuit connection diagram of a second voltage unit according to an embodiment of the application.

FIG. 5 is a circuit connection diagram of a second voltage unit according to an embodiment of the application.

Please refer to FIG. 5, in one embodiment, the second voltage circuit in the vehicle DC voltage conversion circuit includes a seventh switch element Q7, an eighth switch element Q8, a seventh capacitor C7, and an eighth capacitor C8.

The output end of the seventh switch element Q7 is connected to the positive pole Vo2+ of the second voltage, the input end of the eighth switch element Q8 is connected to the negative pole Vo2− of the second voltage, the input end of the seventh switch element Q7 and the output end of the eighth switch Q8 is connected to the secondary non-inverting end. The seventh capacitor C1 and the eighth capacitor C2 are connected in series between the positive and negative poles of the second voltage Vo2, and the common end of the seventh capacitor C1 and the eighth capacitor C2 is connected to the secondary inverting end.

In this embodiment, when the induced voltage of the secondary winding is in the positive half cycle, the seventh switch element Q7 is turned on, the eighth switch element Q8 is turned off, and the current flows through the seventh switch element Q7 to charge the seventh capacitor C7. When the induced voltage of the secondary winding is in the negative half cycle, the seventh switch element Q7 is turned off, the eighth switch element Q8 is turned on, and the current passes through the eighth switch element Q8 to charge the eighth capacitor C8. Therefore, the seventh capacitor C7 and the eighth capacitor C8 connected in series will output the second voltage after the sum of the respective voltages.

In the foregoing embodiment, the positive pole Vo1+ of the first voltage can be set to 12V, the positive pole Vo2+ of the second voltage can be set to 48V, and the negative pole Vo1− of the first voltage can be grounded.

Figure 6:
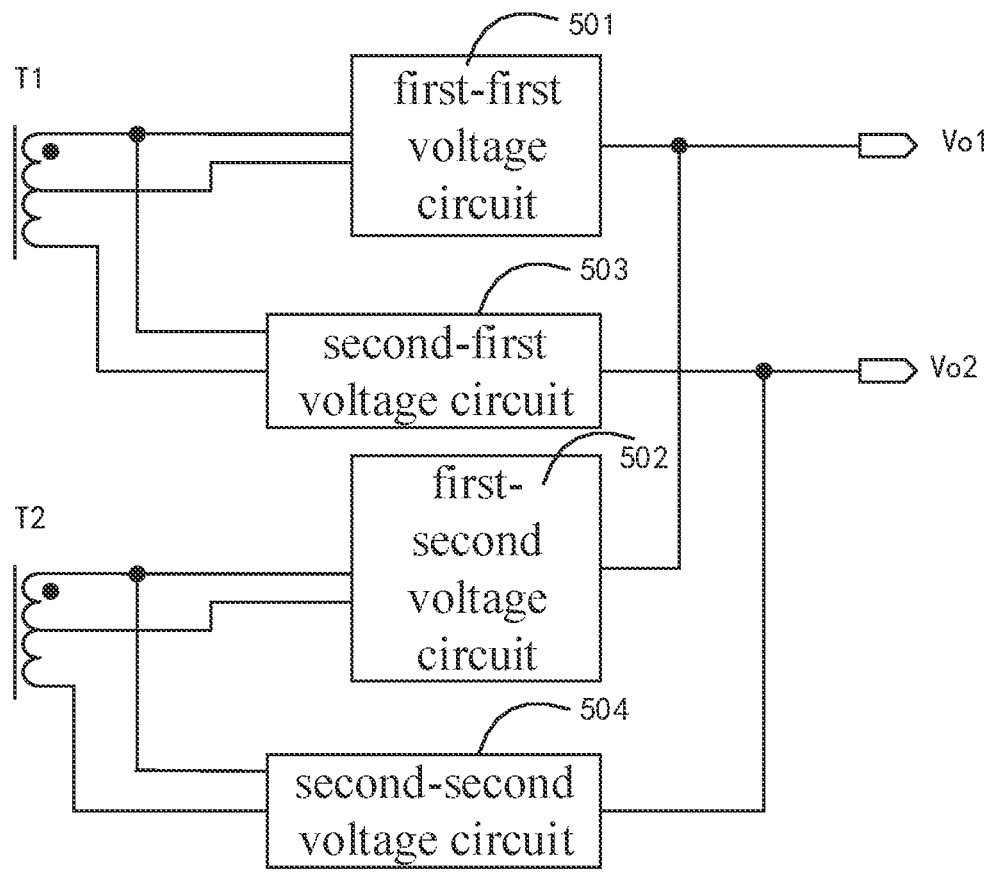
FIG. 6 is a schematic diagram of the secondary side connection of the vehicle DC voltage conversion circuit in an embodiment of the application.

FIG. 6 is a schematic diagram of the secondary side connection of the vehicle DC voltage conversion circuit in an embodiment of the application.

Please refer to FIG. 6, in an embodiment, the transformer module 40 in the vehicle DC voltage conversion circuit includes a first transformer T1 and a second transformer T2. The first secondary winding of the first transformer T1 is provided with a first center tap, and the second secondary winding of the second transformer T2 is provided with a second center tap.

The first voltage unit 51 (please refer to FIG. 1) includes a first-first voltage circuit 501 and a first-second voltage circuit 502 that are output in parallel. The first center tap and the secondary non-inverting end and/or the secondary inverting end of the secondary winding of the first transformer T1 are connected to the first-first voltage circuit 501, and the second center tap and the secondary non-inverting end and/or the secondary inverting end of the second secondary winding are connected to the first-second voltage circuit 502.

The second voltage unit 52 (please refer to FIG. 1) may include a second-first voltage circuit 503 and a second-second voltage circuit 504 that are output in parallel. The secondary non-inverting end and the secondary inverting end of the secondary winding of the first transformer T1 are connected to the second-first voltage circuit 503, and the secondary non-inverting end and the secondary inverting end of the second secondary winding are connected to the second-second voltage circuit 504.

Among them, the first-first voltage circuit 501 and the first-second voltage circuit 502 output the first voltage Vo1 in parallel, and the second-first voltage circuit 503 and the second-second voltage circuit 504 output the second voltage Vo2 in parallel.

Please refer to the embodiment of FIG. 3 at the same time. Corresponding to the primary half bridge and the resonance unit connected in series, the vehicle DC voltage conversion circuit adopts the first voltage circuit and the second voltage circuit that are alternately connected in parallel on the secondary side, which can reduce the outputting ripple, improve outputting power, optimize EMC (Electromagnetic Compatibility, electromagnetic compatibility) design and heat dissipation design.

Figure 7:
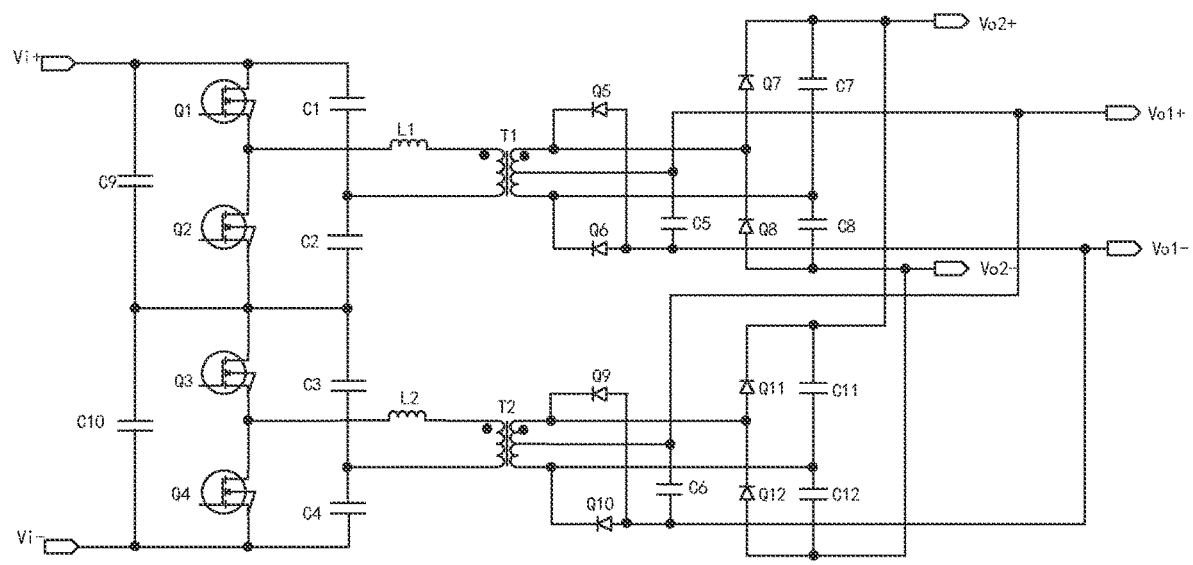
FIG. 7 is a circuit diagram of a vehicle DC voltage conversion circuit in an embodiment of the application.

FIG. 7 is a circuit diagram of a vehicle DC voltage conversion circuit in an embodiment of the application.

As shown in FIG. 7, please refer to the embodiment of FIG. 4 and the embodiment of FIG. 5, the first-second voltage circuit 502 may include a ninth switch Q9, a tenth switch Q10 and a sixth capacitor C6; the second-second voltage circuits 504 may include an eleventh switch element Q11, a twelfth switch element Q12, an eleventh capacitor C11, and a twelfth capacitor C12. For the technical details and specific functions of the first-second voltage circuit 502 and the second-second voltage circuit 504, please refer to the above embodiments, which will not be repeated here.

In the above embodiments, the application does not limit the type of the switch element. Each switch in the vehicle DC voltage conversion circuit can be selected from at least one of MOS field effect transistors, junction field effect transistors, transistors, and relays.

The vehicle DC voltage conversion circuit adopts dual LLC interleaved, primary series and secondary parallel schemes to achieve wide voltage range input, small size, low cost, high efficiency, high reliability, modularity and excellent EMC electrical performance, thermal performance.

Figure 8:
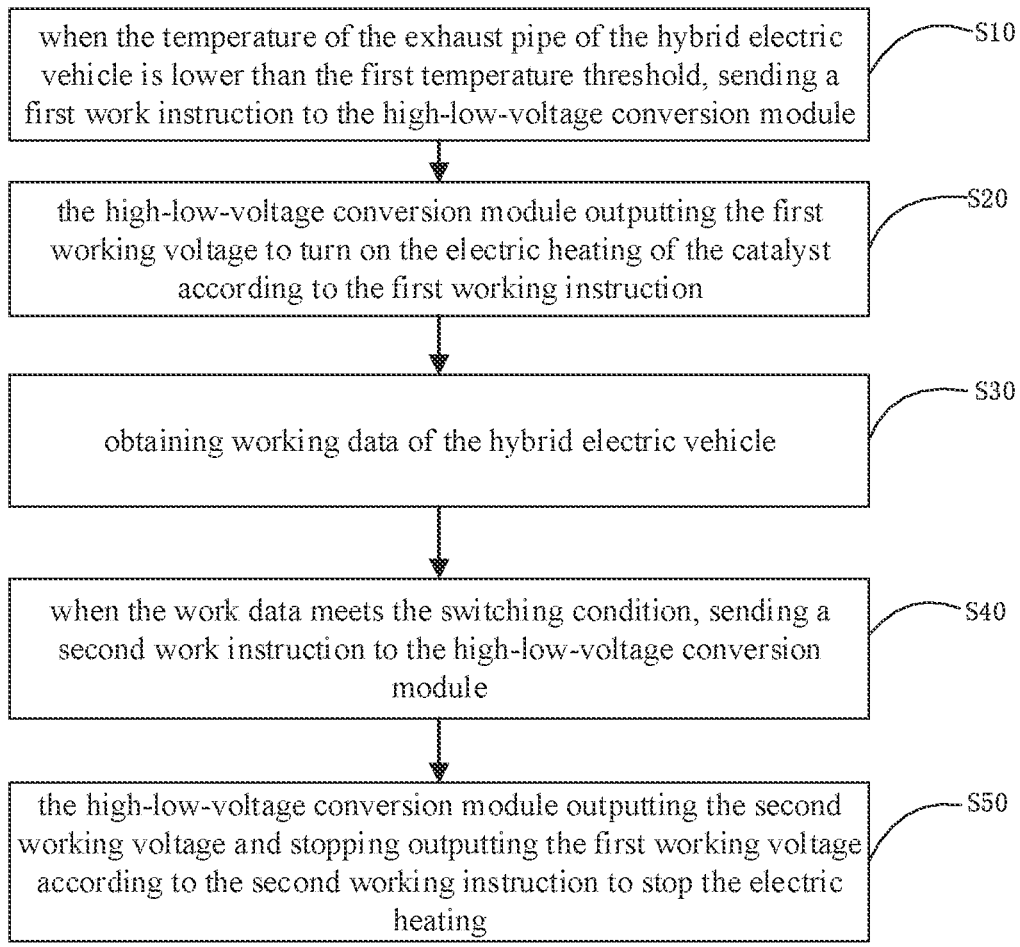
FIG. 8 is a flowchart of a three-way catalytic converter preheating control method according to an embodiment of the application.

On the other hand, the present application also provides a three-way catalytic converter preheating control method, and FIG. 8 is a flowchart of a three-way catalytic converter preheating control method according to an embodiment of the application.

In some cases, the vehicle DC voltage conversion circuit can be used as a high-low-voltage conversion module for application. Referring to FIG. 8, in an embodiment, a three-way catalytic converter preheating control method applied to a hybrid electric vehicle includes:

S10: when the temperature of the exhaust pipe of the hybrid electric vehicle is lower than the first temperature threshold, sending a first work instruction to the high-low-voltage conversion module.

When the hybrid electric vehicle is powered on, the temperature of the exhaust pipe is first detected to determine whether the temperature of the exhaust pipe meets the temperature required for the normal operation of the catalyst.

S20: the high-low-voltage conversion module outputting the first working voltage to turn on the electric heating of the catalyst according to the first working instruction.

When the exhaust pipe temperature is not satisfied, enter the first working voltage mode to start the electric heating function of the catalyst.

S30: obtaining working data of the hybrid electric vehicle.

The current situation of the vehicle is monitored through the work data of the vehicle. For example, the timing of the electric heating of the vehicle and the further detection of the temperature of the exhaust pipe.

S40: when the work data meets the switching condition, sending a second work instruction to the high-low-voltage conversion module.

Determine whether the current working data meets the switching conditions of the working voltage mode.

S50: the high-low-voltage conversion module outputting the second working voltage and stopping outputting the first working voltage according to the second working instruction to stop the electric heating.

When the current working data meets the switching condition, switch to enter the second working voltage mode.

In one embodiment, when the hybrid vehicle's engine is cold-started or the engine is restarted after a long-term shutdown, that is, when the temperature of the exhaust pipe of the hybrid vehicle is lower than the first temperature threshold, the vehicle controller (ie Processing module) send the first working instruction through CAN communication. When the high-low-voltage conversion module receives the instruction, it immediately starts the corresponding first working voltage mode to electrically heat the catalyst. After heating for a period of time or the electric heating temperature reaches the working temperature of the catalyst efficient conversion, the electric heating of the catalyst is completed. The vehicle controller needs to stop supplying power to the electric heater module. After that, during the engine operation, the exhaust pipe temperature is generally not lower than the first temperature threshold. Therefore, the vehicle controller sent the second working instruction according to the needs of the vehicle, the high-low-voltage conversion module turns off the first work voltage according to the second work instruction to stop the corresponding first work voltage mode, to stop electric heating of the catalyst, and switch to the second work voltage mode at this time. The two working modes directly thus realize digital command control.

In this embodiment, the application can not only meet the electric heating requirements by switching between the two working modes, but also has the advantages of small size, low cost, convenient industrial mass production application, high practical value and better economic benefits.

In this embodiment, in order to meet the power demand required for the electric heating of the catalyst, the hybrid electric vehicle engine will charge the power battery module in time according to the hybrid operation strategy during the operation of the hybrid electric vehicle, and the power battery module group will always maintain sufficient power to provide sufficient output power. Before entering the first voltage mode to electrically heat the catalyst, it is first to detect whether the power of the power battery module is sufficient. In the case of insufficient power, the power battery module needs to be charged first. The source of charging can be an external power source, or the engine can be used for power generation and charging.

Figure 9:
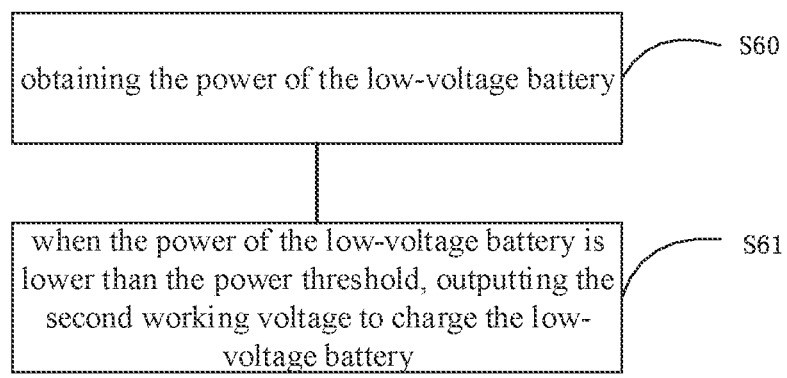
FIG. 9 is a flowchart of a three-way catalytic converter preheating control method according to another embodiment of the application.

FIG. 9 is a flowchart of a three-way catalytic converter preheating control method according to another embodiment of the application.

As shown in FIG. 9, in an embodiment, the three-way catalyst preheating control method before performs the step of S10: when the temperature of the exhaust pipe of the hybrid electric vehicle is lower than the first temperature threshold, sending the first working instruction, include:

S60: obtaining the power of the low-voltage battery;

S61: when the power of the low-voltage battery is lower than the power threshold, outputting the second working voltage to charge the low-voltage battery.

In this embodiment, since the low-voltage battery is the operating power supply for the entire vehicle system including meters and sensors, before entering the first voltage mode to electrically heat the catalyst, it is first to detect whether the low-voltage battery has sufficient power. In the case of insufficient use, a power battery needs to be used to charge the low-voltage battery through the high-low-voltage conversion module.

In one embodiment, the preheating control method of the three-way catalytic converter starts the engine of the hybrid electric vehicle after executing the steps of S50: the high-low voltage conversion module outputting the second working voltage and stopping the output of the first working voltage according to the second working instruction.

After the electrical heating of the catalyst is completed, the temperature of the exhaust pipe has reached the first temperature threshold, which meets the needs of the catalyst for normal operation. The engine can be started normally.

In an embodiment, the working data of the hybrid electric vehicle includes the output duration of the first working voltage. The switching condition of the three-way catalytic converter preheating control method is that the first working voltage output duration reaches the first time threshold.

After experiments and calculations, for example, 48V voltage in the case of working for 1-2 minutes (for example, 1.5 minutes), the exhaust pipe temperature has been able to reach the temperature at which the catalyst is fully working. Therefore, when the heating time of the electric catalyst heating module reaches the preset first time threshold, the vehicle controller switches the working mode according to the demand of the vehicle.

In another embodiment, the working data of the hybrid vehicle includes exhaust pipe temperature. The switching condition of the three-way catalyst preheating control method is that the exhaust pipe temperature is not lower than the second temperature threshold. Wherein, the first temperature threshold may be equal to the second temperature threshold.

In this embodiment, the current temperature of the exhaust pipe is directly monitored to determine whether the heating is over. The electric heating temperature reaches the working temperature of the catalyst for efficient conversion, and the vehicle controller switches the working mode according to the needs of the vehicle.

Figure 10:
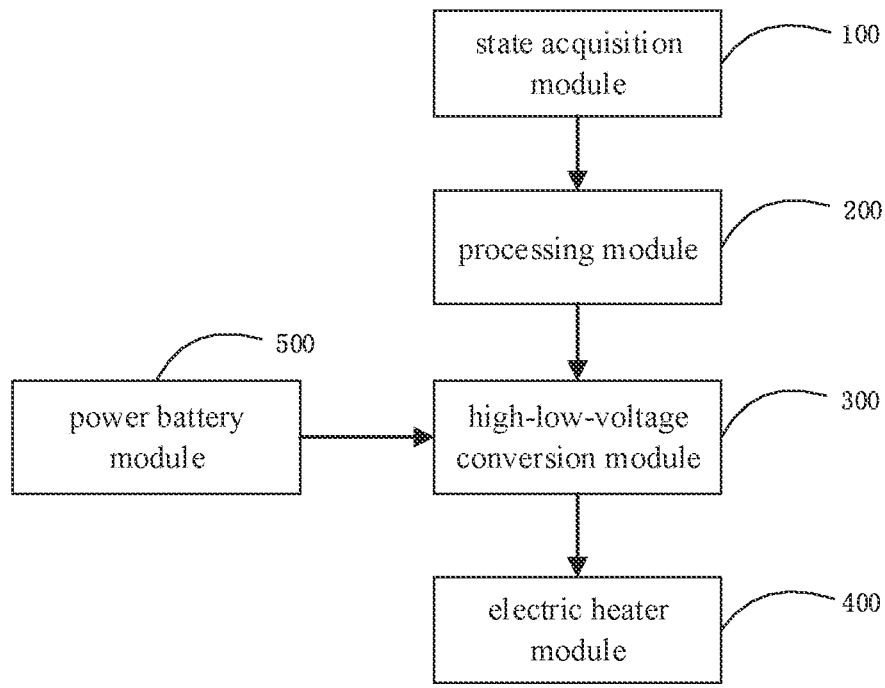
FIG. 10 is a block diagram of a three-way catalytic converter preheating control system according to an embodiment of the application.

On the other hand, the present application also provides a three-way catalytic converter preheating control system applied to a hybrid electric vehicle. FIG. 10 is a block diagram of a three-way catalytic converter preheating control system according to an embodiment of the application.

Please refer to FIG. 10, in an embodiment, the three-way catalyst preheating control system includes a state acquisition module 100, a processing module 200, a high-low-voltage conversion module 300, an electric heater module 400, and a power battery module 500. Wherein, the state acquisition module 100, the processing module 200, the high-low-voltage conversion module 300 and the electric heater module 400 are connected in sequence, and the power battery module 500 is connected to the high-low-voltage conversion module 300.

Wherein, the state acquisition module 100 is used to acquire and send the exhaust pipe temperature of the hybrid electric vehicle and the working data of the hybrid electric vehicle to the processing module 200. The processing module 200 is used to send a first working instruction to the high-low voltage conversion module 300 when the exhaust pipe temperature of the hybrid electric vehicle is lower than the first temperature threshold, and send a second working instruction to the high-low voltage conversion module 300 when the working data meets the switching conditions.

The high-low-voltage conversion module 300 outputs the first working voltage according to the first working instruction so that the electric heater module 400 electrically heats the catalyst; according to the second working instruction, it outputs the second working voltage and stops outputting the first working voltage, so that the electric heater module 400 stops electric heating.

In one embodiment, when the engine of the hybrid electric vehicle is cold-started or the engine is stopped for a long time and then restarted, the state acquisition module 100 acquires and sends the working data that the exhaust pipe temperature of the hybrid electric vehicle is lower than the first temperature threshold to the processing module 200, and the processing module 200 sends the first working instruction through CAN communication. When the high-low-voltage conversion module 300 receives the instruction, it immediately starts the corresponding first working voltage mode, and waits for the electric heater module 400 to electrically heat the catalyst. After heating for a period of time or when the electric heating temperature reaches the working temperature for efficient conversion of the catalyst, the electric heating of the catalyst is completed. After that, when the engine is running, the temperature of the exhaust pipe is generally not lower than the first temperature threshold, so it is necessary to stop power supply to the electric heater module 400. At this time, the processing module 200 sends the second work instruction according to the vehicle demand, and the high-low-voltage conversion module turns off the first work voltage according to the second work instruction to stop the corresponding first work voltage mode, and stops the electric heating of the catalyst. At this time, it switches to the second working voltage mode. The two working modes therefore realize digital command control.

In this embodiment, in order to meet the power requirements for electric heating, the engine charges the power battery module 500 in time during the operation of the hybrid vehicle, and the power battery module 500 will always maintain sufficient power to provide sufficient output power. Before entering the first voltage mode to electrically heat the catalyst, the processing module 200 determines whether to charge the power battery according to the power-off state sent by the power battery. The source of charging can be an external power source, or the engine can be used for power generation and charging.

In an embodiment, the processing module 200 of the three-way catalytic converter preheating control system is also used to start the engine of the hybrid vehicle.

In this embodiment, after the electrical heating of the catalyst is completed, the temperature of the exhaust pipe has reached the first temperature threshold, which meets the needs of the catalyst for normal operation. The engine can be started normally. During engine operation thereafter, the exhaust pipe temperature is generally not lower than the first temperature threshold.

In an embodiment, the first working voltage of the three-way catalytic converter preheating control system of the hybrid electric vehicle electric heating control system is 48V, and the second working voltage is 12V.

In this embodiment, there are currently two types of catalyst electric heaters, 12V/2 kW and 48V/4 kW, on the market. After tests, it is found that the 48V/4 kWEHC electric heater has a better use effect, which can meet the future National VII emission requirements; the working voltage of the 48V/4 KW electric heater is 48V. Currently, the DC-DC of hybrid vehicles on the market generally only outputs 12V.

In one embodiment, the first working voltage 48V and the second working voltage 12V in the high-low-voltage conversion module 300 share the main circuit, control circuit, and heat dissipation system of the high-low-voltage conversion module, effectively freeing up space for ornaments and reducing product volume, which greatly reduces product costs and facilitates the implementation of industrialized mass production applications.

In one embodiment, the working data of a hybrid electric vehicle includes the output duration of the first working voltage. The switching condition of the preheating control system of the three-way catalytic converter is that the first working voltage output time reaches the first time threshold.

Through experiments and calculations, 48V has been able to make the exhaust pipe temperature reach the full working temperature of the catalyst when working for 1-2 minutes (for example, 1.5 minutes). Therefore, when the heating time of the catalyst electric heating module reaches the preset first time threshold, the vehicle controller switches the working mode according to the vehicle requirements.

In another embodiment, the working data for a hybrid electric vehicle includes the exhaust pipe temperature. The switching condition of the pre-heating control system of the three-way catalytic converter is that the exhaust pipe temperature is not lower than the second temperature threshold.

In this embodiment, the current temperature of the exhaust pipe is directly monitored to determine whether the heating is over. When the electric heating temperature of the catalyst electric heater module 400 reaches the working temperature for efficient conversion of the catalyst, the vehicle controller switches the working mode according to the demand of the vehicle. Wherein, the first temperature threshold may be equal to the second temperature threshold.

Figure 11:
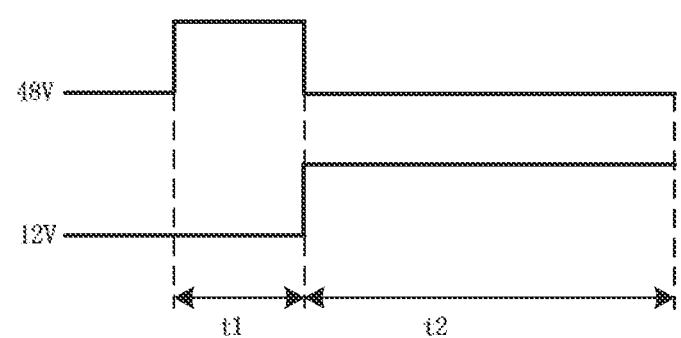
FIG. 11 is a working sequence diagram of a three-way catalyst preheating control system according to an embodiment of the application.

FIG. 11 is a working sequence diagram of a three-way catalyst preheating control system according to an embodiment of the application.

As shown in FIG. 11, in one embodiment, when the car wakes up, the three-way catalytic converter preheating control system first provides a working voltage of 48V to enter the first working voltage mode, which corresponds to the t1 period in the figure. After reaching the first time threshold of 1-2 minutes, the three-way catalytic converter preheating control system turns off the 48V working voltage, outputs the second working voltage of 12V, and enters the second working voltage mode, which corresponds to the t2 period in the figure.

In the t2 period, the engine is started after the temperature of the exhaust pipe has reached the high-efficiency operating temperature of the catalyst.

On the other hand, the present application also provides a vehicle. Specifically, the vehicle includes a vehicle body and a three-way catalyst preheating control system as described above. When the vehicle uses the three-way catalytic converter preheating control system, the technical principles involved are the same as those in the above embodiments, and will not be repeated here.

In an embodiment, the working principle and features of the vehicle's three-way catalyst preheating are as follows:
(1) the power battery module can adopt a high-voltage, high-power lithium-ion battery pack, which can meet the 4 kW/2 minute power demand required for the electric heating of the catalyst. During the operation of the hybrid vehicle, the engine will charge the power battery module in time. The battery will always maintain sufficient power to provide sufficient output power.
(2) The 48V/4 kW power supply can be integrated into the 12V DC-DC, where the main loop of the high and low voltage converter, the control circuit, and the heat dissipation system are shared with the 12V DC-DC.
(3) Since 48V/4 kW needs to be used for 1 to 2 minutes before the engine starts, not only the frequency of use is less, but the working time is also shorter. The power devices and heat dissipation system of the original 12V DC-DC main circuit only need to be adjusted appropriately. Meet the 48V/4 kW EHC electric heating power demand for 1-2 minutes.

(4) In the high-low-voltage conversion circuit integrated with 12V and 48V, the two voltage outputting ends of 12V and 48V are respectively provided with power electronic switches for switching control of different working voltage modes. The electronic switch can be set at the positive or negative end of each output of 12V and 48V.

(5) The three-way catalytic converter preheating control system has two working modes: 48V working mode and 12V working mode. The switching of the two working modes is digitally controlled by the communication command sent by the vehicle controller through the CAN bus.

(6) 48V and 12V adopt a time-sharing working mechanism: when the engine is cold-started or the engine is restarted after a long period of shutdown, the vehicle controller sends a 48V work instruction through CAN communication, and when the 48V&12V high-low-voltage conversion module receives this command, it immediately starts the 48V working mode, the electric catalyst heating obtains 48V DC power supply. After heating for 1 to 2 minutes, the electric heater temperature reaches the working temperature of the catalyst for efficient conversion, and the vehicle controller issues a 48V shutdown command, 48V the power supply immediately stops supplying power to the electric heater, the catalyst electric heating work is completed, and then the vehicle controller switches to the 12V working mode according to the vehicle demand.

(7) The vehicle controller can make comprehensive judgments based on the temperature of the engine exhaust pipe, the power of the power battery, the voltage of the 12V low-voltage battery, and the working conditions of the vehicle's low-voltage load, and then switch the 48V/12V operating mode.

On the other hand, the present application also provides a storage medium, specifically, a computer program is stored on the storage medium, When the computer program is executed by the computer, it can realize the above-mentioned three-way catalyst preheating control method. When the computer program realizes the preheating control method of the three-way catalytic converter, the technical principles involved are the same as those in the above embodiment, and will not be repeated here.

As described above, the vehicle DC voltage conversion circuit provided by the present application can not only output a first voltage such as 12V DC power supply, but also output a second voltage such as 48V at the same time, and has the advantages of small size, high efficiency, low cost, and flexibility. The advantages of industrialization. The vehicle DC voltage conversion circuit provided in this application is applied to a three-way catalytic converter preheating control method, system, vehicle and storage medium. It can provide two working modes through digital control instructions, and can use power when the temperature of the exhaust pipe is low. The battery pre-heats the catalyst in the three-way catalytic converter through the high-low-voltage conversion module.

The above are only the preferred embodiments of the application, and do not limit the scope of the application. Any equivalent structure or equivalent process transformation made by the content of the application and the accompanying drawings, or directly or indirectly applied to other related The technical field is equally included in the scope of patent protection of this application.

What is claimed is:

1. A vehicle DC voltage conversion circuit, characterized by comprising a high-voltage battery, a primary-side-bridge module, a resonance module, a transformer module, and a secondary-side-output module connected in sequence, wherein the secondary-side-output module comprises a first voltage unit configured to output a first voltage output module and a second voltage unit configured to output a second voltage, secondary winding of the transformer module is connected to the first voltage unit and the second voltage unit respectively;

the circuit further comprising a drive module connected with the primary-side-bridge module; the primary-side-bridge module comprising a plurality of primary side half bridges connected to each other, each primary side half bridge comprising two switch elements connected in series; the drive module is respectively connected to the control end of each switch element of the primary-side-bridge module, to control the on-off of the switch element of the primary-side-bridge module; and wherein the transformer module comprises a secondary winding with a center tap, the center tap and the secondary non-inverting end and/or the secondary inverting end of the secondary winding are connected to a first voltage circuit of the first voltage unit: the secondary non-inverting end and the secondary inverting end of the secondary winding are connected to a second voltage circuit of the second voltage unit.

2. The circuit according to claim 1, characterized in that, the primary-side-bridge module comprises a first half bridge and a second half bridge connected in series, and the first half bridge comprises a first switch element and a second switch element connected in series, the second half-bridge comprises a third switch element and a fourth switch element connected in series, a common end of the first switch element and the second switch element is connected to the resonance module, and the common end of the fourth switch element and the third switch element is connected to the resonance module.

3. The circuit according to claim 2, characterized in that, the resonance module comprises a first resonance unit and a second resonance unit, the first resonance unit comprises a first inductor, a first capacitor, and a second capacitor, and the second resonance unit comprises a second inductor, a third capacitor, and a fourth capacitor, the transformer module comprises a first transformer and a second transformer;

the first switch element, the second switch element, and the third switch element and the fourth switch element are connected in series between a positive bus bar and a negative bus bar of the high-voltage battery in sequence, and the common end of the first switch element and the second switch element is connected to a first end of the first inductor, the common end of the third switch element and the fourth switch element is connected to a first end of the second inductors;

a second end of the first inductor is connected to a primary non-inverting end of the first transformer, a second end of the second inductor is connected to a primary non-inverting end of the second transformer;

the first capacitor, the second capacitor, the third capacitor, and the fourth capacitor are connected in series between the positive bus bar and the negative bus bar in sequence, a common end of the second capacitor and the third capacitor is connected to the common end of the second switch element and the third switch element, the common end of the first capacitor and the second capacitor is connected to a primary inverting end of the first transformer, and a common end of the third capacitor and the fourth capacitor is connected to a primary inverting end of the second transformer.

4. The circuit according to claim 2, characterized in that, the first switch element, the second switch element, the third switch element, and the fourth switch element are selected from at least one of MOS field effect transistors, junction field effect transistors, transistors and relays.

5. The circuit according to claim 1, characterized in that, the first voltage circuit comprises a fifth switch element and a fifth capacitor, and an output end of the fifth switch element is connected to the secondary non-inverting end or the secondary inverting end, and the fifth capacitor is connected between an input end of the fifth switch element and the center tap.

6. The circuit according to claim 5, characterized in that, the first voltage circuit further comprises a sixth switch element, an input end of the sixth switch element is connected to the input end of the fifth switch element, and the secondary non-inverting end and the secondary inverting end are respectively connected to one output end of the sixth switch element and the fifth switch element.

7. The circuit according to claim 6, characterized in that, the fifth switch element and the sixth switch element are selected from at least one of diodes, MOS field effect transistors, junction field effect transistors, transistors, and relays.

8. The circuit according to claim 1, characterized in that, the second voltage circuit comprises a seventh switch element, an eighth switch element, a seventh capacitor, and an eighth capacitor; the output end of the seventh switch element is connected to the positive pole of the second voltage, the input end of the eighth switch element is connected to the negative pole of the second voltage, and an input end of the seventh switch element and an output end of the eighth switch element are connected to the secondary non-inverting end; the seventh capacitor and the eighth capacitor are connected in series between the positive and negative pole of the second voltage, and a common end of the seventh capacitor and the eighth capacitor is connected to the secondary inverting end.

9. The circuit according to claim 1, characterized in that, the transformer module comprises a first transformer and a second transformer, a first secondary winding of the first transformer is provided with a first center tap, and a second secondary winding of a second transformer is provided with a second center tap:

the first voltage unit comprises a first-first voltage circuit and a first-second voltage circuit outputting in parallel, the first center tap and the secondary non-inverting end and/or the secondary inverting end of the first secondary winding are connected to the first-first voltage circuit, and the second center tap and the secondary non-inverting end and/or the secondary inverting end of the second secondary winding are connected to the first-second voltage circuit;

and/or, the second voltage unit comprises a second-first voltage circuit and a second-second voltage circuit outputting in parallel, and the secondary non-inverting end and the secondary inverting end of the first secondary winding are connected to the second-first voltage circuit, and the secondary non-inverting end and the secondary inverting end of the second secondary winding are connected to the second-second voltage circuit.

\* \* \* \* \*